US011749862B2

(12) United States Patent
Umemura

(10) Patent No.: US 11,749,862 B2
(45) Date of Patent: Sep. 5, 2023

(54) BATTERY PACK AND BATTERY HOLDER

(71) Applicant: TOYOTA JIDOSHA KABUSHIKI KAISHA, Toyota (JP)

(72) Inventor: Kohji Umemura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 17/110,908

(22) Filed: Dec. 3, 2020

(65) Prior Publication Data

US 2021/0202922 A1    Jul. 1, 2021

(30) Foreign Application Priority Data

Dec. 26, 2019  (JP) .............................. JP2019-236715

(51) Int. Cl.
*H01M 50/249*  (2021.01)
*H01M 50/209*  (2021.01)
*H01M 50/242*  (2021.01)
*H01M 50/291*  (2021.01)
*H01M 10/6555*  (2014.01)

(52) U.S. Cl.
CPC ..... *H01M 50/249* (2021.01); *H01M 10/6555* (2015.04); *H01M 50/209* (2021.01); *H01M 50/242* (2021.01); *H01M 50/291* (2021.01)

(58) Field of Classification Search
None
See application file for complete search history.

(56) References Cited

U.S. PATENT DOCUMENTS

| 5,556,722 | A | 9/1996 | Narukawa et al. |
| 7,273,679 | B2* | 9/2007 | Yoon ....................... H01M 4/13 |
| | | | 429/211 |
| 2003/0003355 | A1* | 1/2003 | Ueda .................... H01M 50/119 |
| | | | 429/185 |
| 2010/0203373 | A1 | 8/2010 | Kawase et al. |
| 2011/0200862 | A1* | 8/2011 | Kurosawa ............... H01M 6/46 |
| | | | 429/120 |
| 2011/0223454 | A1* | 9/2011 | Urano ............... H01M 10/0525 |
| | | | 429/94 |
| 2013/0089763 | A1* | 4/2013 | Lee ..................... H01M 50/342 |
| | | | 429/82 |
| 2015/0188103 | A1 | 7/2015 | Minami et al. |
| 2016/0141737 | A1 | 5/2016 | Kubota et al. |
| 2019/0157709 | A1 | 5/2019 | Umemura |

FOREIGN PATENT DOCUMENTS

| CN | 109818038 A | 5/2019 |
| JP | H07-326331 A | 12/1995 |
| JP | 2005-310579 A | 11/2005 |

(Continued)

*Primary Examiner* — Gregg Cantelmo
(74) *Attorney, Agent, or Firm* — Oliff PLC

(57) ABSTRACT

A battery pack disclosed herein includes a plurality of arranged battery cells and a battery holder configured to hold the battery cells. The battery holder includes a planar portion extending along a broad width surface of each of the battery cells and a protruding portion provided at each of both ends of the planar portion and protruding from the broad width surface. The protruding portion includes two recessed portions each being configured such that a corresponding one of side portions provided at both ends of the broad width surface fits therein.

13 Claims, 6 Drawing Sheets

(56) References Cited

FOREIGN PATENT DOCUMENTS

| | | |
|---|---|---|
| JP | 2006-048996 A | 2/2006 |
| JP | 2006-338992 A | 12/2006 |
| JP | 2009-259450 A | 11/2009 |
| JP | 2010-040181 A | 2/2010 |
| JP | 2014-102939 A | 6/2014 |
| JP | 2014-238928 A | 12/2014 |
| JP | 2015-125859 A | 7/2015 |
| JP | 2016-081599 A | 5/2016 |
| JP | 2017-157274 A | 9/2017 |
| JP | 2017-212214 A | 11/2017 |
| KR | 10-2010-0022533 A | 3/2010 |
| WO | 2018/155081 A1 | 8/2018 |

\* cited by examiner

BATTERY PACK AND BATTERY HOLDER

CROSS REFERENCE OF RELATED APPLICATION

The present application claims priority from Japanese Patent Application No. 2019-236715 filed on Dec. 26, 2019, which is incorporated by reference herein in its entirety.

BACKGROUND

The present disclosure relates to a battery pack and a battery holder.

In JP 2009-259450A, a battery holder that holds a battery cell is disclosed. The battery holder disclosed in JP 2009-259450A has a surface that faces the battery cell and forms a refrigerant passage through which refrigerant flows between the battery cell and the surface itself and a seal member that seals the refrigerant passage.

SUMMARY

Incidentally, a battery pack mounted on a vehicle receives a large impact at the time of collision. Therefore, for a battery holder that holds a battery cell in the battery pack, improvement of a function of protecting the battery cell is desired.

An embodiment of a battery pack disclosed herein includes a plurality of arranged battery cells and a battery holder configured to hold the battery cells. Each of the battery cells includes an electrode body and a battery case that stores the electrode body. The battery case includes a pair of broad width surfaces facing each other, a pair of narrow width surfaces each being orthogonal to the broad width surfaces and facing each other, and four side portions each connecting corresponding ones of the broad width surfaces and the narrow width surfaces. The plurality of battery cells are arranged such that the broad width surfaces sequentially face each other and the pair of narrow width surfaces are aligned. The battery holder includes a planar portion extending along a corresponding one of the broad width surfaces of the battery cells, and a protruding portion provided at each of both ends of the planar portion and protruding from the broad width surface. The protruding portion includes a recessed portion in which a corresponding one of the side portions provided at both sides of the corresponding broad width surface fits.

According to the above described battery pack, deformation accompanied with plastic deformation is less likely to occur in the battery case when a side at which the narrow width surfaces are aligned receives a load. Moreover, a position in the battery case in which the deformation tends to occur can be set in each of the side portions.

The planar portion of the battery holder may be configured such that a portion thereof facing an intermediate portion of the corresponding broad width surface excluding a peripheral portion of the corresponding broad width surface is raised. In the above described configuration, a confining pressure can be easily caused to act on the broad width surfaces via the battery holder.

The battery holder may include an intermediate holder disposed between adjacent battery cells of the plurality of battery cells. In this case, the intermediate holder may include a planar portion extending along the broad width surfaces of the adjacent battery cells, the broad width surfaces facing each other, and a protruding portion provided at each of both ends of the planar portion and protruding from the broad width surfaces of the adjacent battery cells, the broad width surfaces facing each other. The protruding portion may include a recessed portion in which a corresponding one of the side portions provided at both sides of each of the broad width surfaces of the adjacent battery cells, the broad width surfaces facing each other, fits.

The intermediate holder may be disposed between every adjacent battery cells of the plurality of battery cells. In this case, a position in the battery case in which deformation tends to occur when a side at which the narrow width surfaces are aligned receives a load can be set in each of the side portions of each battery cell.

The planar portion of the intermediate holder may be configured such that a portion thereof facing an intermediate portion of the corresponding broad width surface excluding a peripheral portion of the corresponding broad width surface is raised toward each of both sides. According to the above described configuration, a confining pressure can be easily caused to act on the broad width surfaces via the battery holder.

The battery holder may include an end holder configured to hold a battery cell of the plurality of battery cells which is disposed at an end of the plurality of battery cells. In this case, the end holder may be provided at each of both ends of the plurality of battery cells. The planar portion of the end holder may be configured such that a portion thereof facing an intermediate portion of a corresponding one of the broad width surfaces of the battery cell disposed at the end excluding a peripheral portion of the corresponding one of the broad width surfaces is raised, the broad width surfaces facing each other. The end holder may be configured such that an opposite side to a side facing the battery cell disposed at the end is a flat surface. In this case, the opposite side of the end holder is a flat surface, and therefore, space can be saved in a direction in which the plurality of battery cells are arranged.

The electrode body may include a pair of flat surfaces each facing a corresponding one of the pair of broad width surfaces of the battery case, a first current collecting section extending toward a first narrow width surface of the pair of narrow width surfaces of the battery case and integrated toward a central portion in a direction in which the pair of the broad width surfaces face each other, and a second current collecting section extending toward a second narrow width surface of the pair of narrow width surfaces of the battery case and integrated toward the central portion in the direction in which the pair of the broad width surfaces face each other. According to the above described battery holder, deformation accompanied with plastic deformation is less likely to occur in the battery case when a side at which the narrow width surfaces are aligned receives a load. Moreover, a position in the battery case in which deformation tends to occur can be set in each of the side portions. When the above described electrode body is further employed, there are clearances between the electrode body and the battery case near the side portions of the battery case. Therefore, the electrode body and the battery case are less likely to contact each other.

A thickness of the narrow width surfaces of the battery case may be larger than that of the broad width surfaces. An edge portion of each of the broad width surfaces which extends in a height direction may have a thickness that gradually increases toward a corresponding one of the narrow width surfaces.

An embodiment of a battery holder disclosed herein includes a planar portion provided so as to coincide with a broad width surface of a rectangular battery cell which has been determined in advance and a protruding portion provided at an edge of each of ends of the planar portion and protruding from the broad width surface. The protruding portion includes a recessed portion in which a corresponding one of the side portions provided at both sides of the broad width surface fits when the broad width surface of the battery cell is formed to coincide with the planar portion.

Another embodiment of the battery holder disclosed herein includes a planar portion provided so as to coincide with a broad width surface of a rectangular battery cell which has been determined in advance and a protruding portion provided at an edge of each of ends of the planar portion and protruding from the broad width surface. The protruding portion includes a recessed portion in which a corresponding one of side portions provided at both sides of the broad width surface fits when the broad width surface of the battery cell is aligned with each of both sides of the planar portion.

The planar portion may be configured such that a portion thereof facing an intermediate portion of the broad width surface excluding a peripheral portion of the broad width surface is raised.

DETAILED DESCRIPTION

Figure 1:
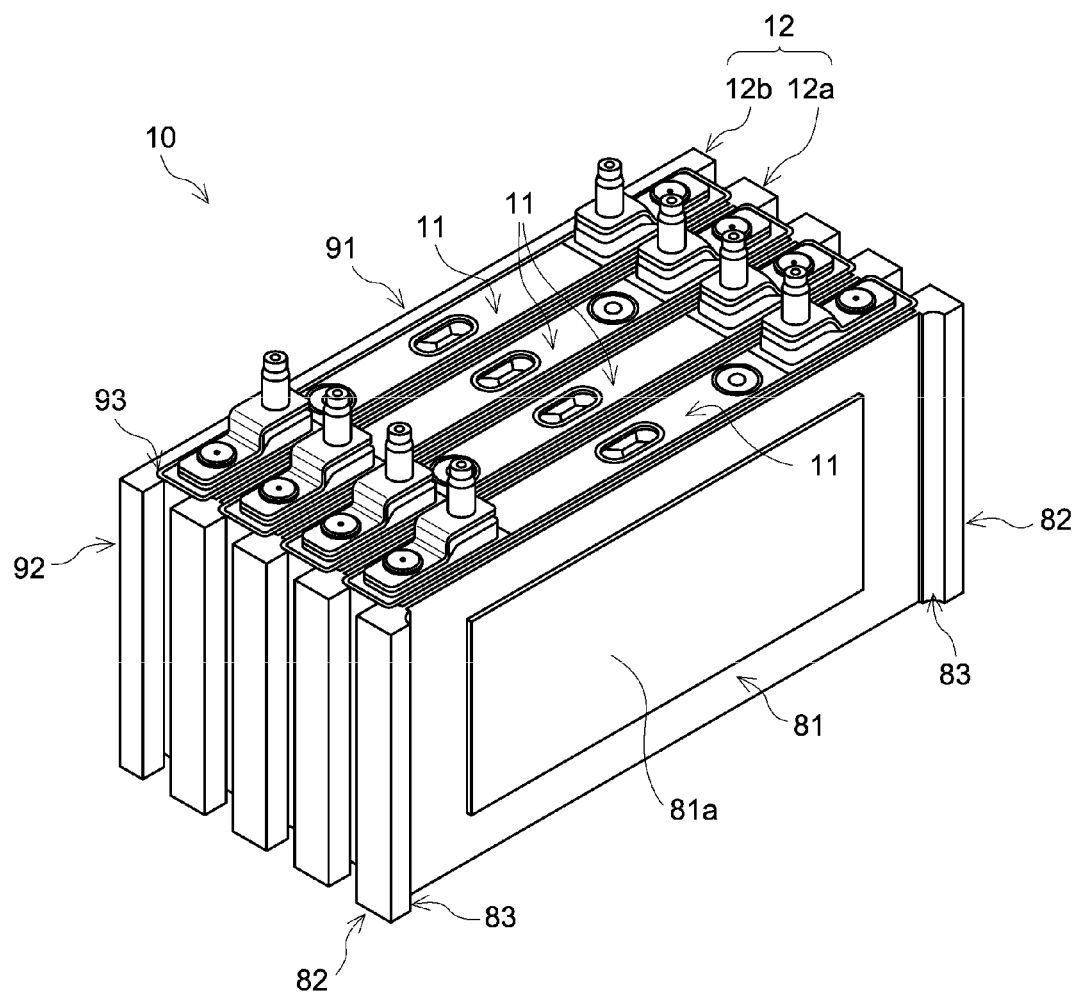
FIG. 1 is a perspective view illustrating a battery pack 10 disclosed herein.

Hereinbelow, embodiments of a battery pack and a battery holder disclosed herein will be described. As a matter of course, the embodiments described herein are not intended to be particularly limiting the present disclosure. The present disclosure is not limited to the embodiments described herein, unless specifically stated otherwise. Dimension relations (length, width, thickness, or the like) in the drawings do not necessarily reflect actual dimensional relations. As used herein, the expression "X to Y" that indicates a numerical value range means "equal to or more than X and equal to or less than Y", unless specifically stated otherwise.

Figure 2:
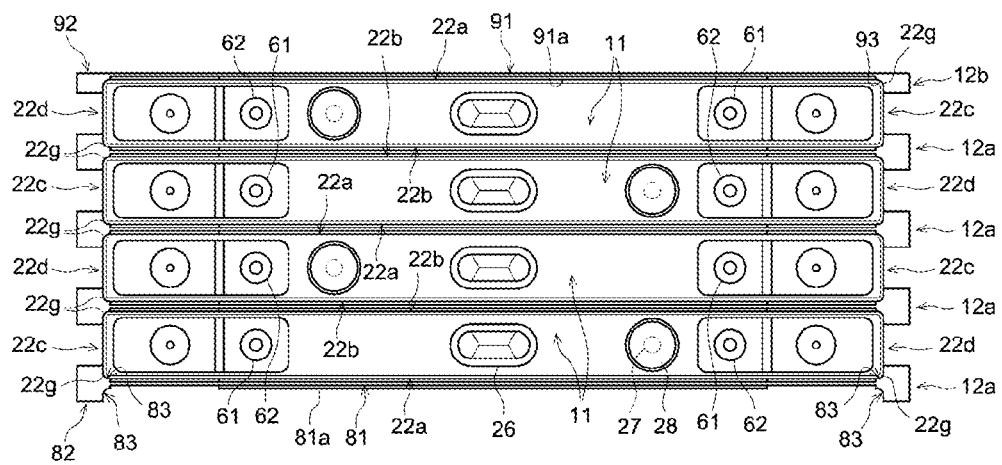
FIG. 2 is a plan view of the battery pack 10.

FIG. 1 is a perspective view illustrating a battery pack 10 disclosed herein. FIG. 2 is a plan view of the battery pack 10. As illustrated in FIG. 1 and FIG. 2, the battery pack 10 disclosed herein includes a plurality of battery cells 11 and at least one intermediate holder 12a. Herein, the plurality of battery cells 11 may be arranged in a predetermined arrangement. The intermediate holder 12a is disposed between adjacent ones of the plurality of battery cells 11. Although not illustrated, in an embodiment illustrated in FIG. 1, the intermediate holder 12a is disposed between every adjacent ones of the plurality of battery cells 11. The battery pack 10 may further include an end holder 12b that holds one of the plurality of battery cells 11 which is disposed at an end of the plurality of battery cells 11, as illustrated in FIG. 1. The battery pack 10 may include the end holder 12b at each of both ends of the plurality of battery cells 11.

Herein, the intermediate holder 12a and the end holder 12b commonly have a function of positioning the battery cells 11 in respective predetermined positions. The end holder 12b can be possibly an embodiment of "the battery holder" defined by the function of "positioning a battery cell in a predetermined position" in a broad sense. The intermediate holder 12a is disposed between adjacent ones of the battery cells 11. The intermediate holder 12a can be possibly an embodiment of "the battery holder" in a broad sense and can be referred to as "the intermediate holder."

Figure 3:
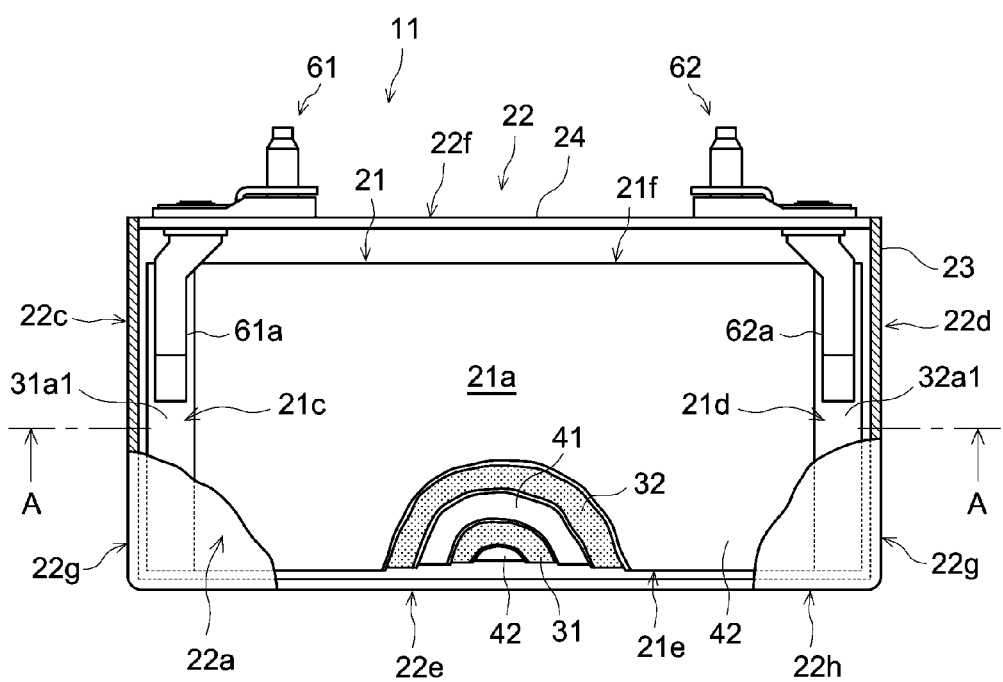
FIG. 3 is a front view of a battery cell 11.
Figure 4:
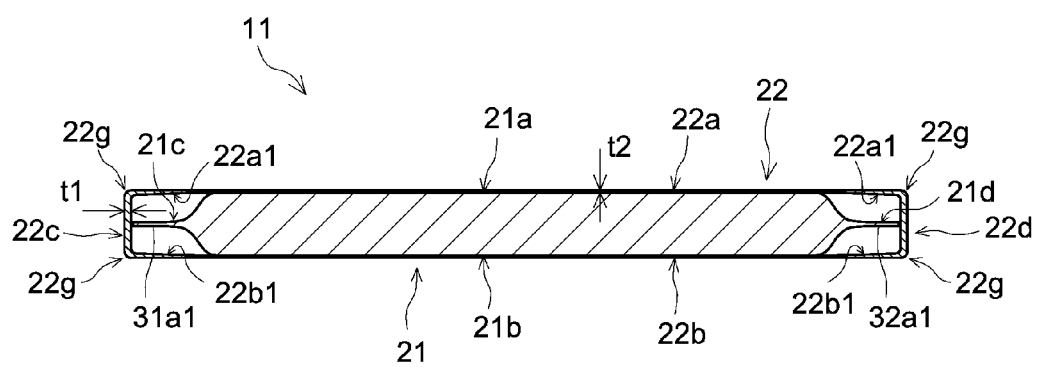
FIG. 4 is a cross-sectional view of the battery cell 11 taken along the line A-A of FIG. 3.

FIG. 3 is a front view of the battery cell 11. FIG. 4 is a cross-sectional view of the battery cell 11 taken along the line A-A of FIG. 3. In FIG. 3, a state in which a broad width surface 22a on a front side of a battery case 22 is partially raptured and inside of the battery case 22 is exposed. As illustrated in FIG. 3 and FIG. 4, the battery cell 11 includes an electrode body 21 and the battery case 22 that stores the electrode body 21.

As illustrated in FIG. 3 and FIG. 4, the battery case 22 is a case having an approximately rectangular parallelepiped shape. The battery case 22 includes a pair of broad width surfaces 22a and 22b, a pair of narrow width surfaces 22c and 22d, a bottom face 22e, and an upper face 22f.

In this embodiment, each of the broad width surfaces 22a and 22b is a surface surrounded by long sides of the battery case 22 having an approximately rectangular parallelepiped shape when viewed from top and sides thereof in a height direction. The broad width surfaces 22a and 22b are largest surfaces of the surfaces of the battery case 22. The broad width surfaces 22a and 22b face each other in a short-side direction. The broad width surfaces 22a and 22b can be also referred to as long-side side surfaces as side surfaces extending along long sides.

Each of the narrow width surfaces 22c and 22d is orthogonal to the pair of the broad width surfaces 22a and 22b and the narrow width surfaces 22c and 22d face each other. In this embodiment, each of the narrow width surfaces 22c and 22d is a surface surrounded by short sides of the battery case 22 having an approximately rectangular parallelepiped shape when viewed from top and sides thereof in the height direction. Among side peripheral surfaces of the battery case 22, each of the narrow width surfaces 22c and 22d has a smaller area than that of each of the broad width surfaces 22c and 22d. The narrow width surfaces 22c and 22d face each other in a long-side direction. The narrow width surfaces 22c and 22d can be also referred to as short-side side surfaces as side surfaces extending along the short sides.

The battery case 22 includes the pair of the broad width surfaces 22a and 22b, the pair of narrow width surfaces 22c and 22d, and four side portions 22g each of which connects a corresponding one of the broad width surfaces 22a and 22b and a corresponding one of the narrow width surfaces 22c and 22d at a circumference of the battery cell 11. An outer shape of each of the side portions 22g is made into a curved surface that connects a corresponding one of the broad width surfaces 22a and 22b and a corresponding one of the narrow width surfaces 22c and 22d, which are orthogonal to each other.

The bottom surface 22e is disposed so as to be orthogonal to each of the pair of the broad width surfaces 22a and 22b and the pair of narrow width surfaces 22c and 22d. In a peripheral portion of the bottom surface 22e, a curved surface 22h continuous from the bottom surface 22e is formed in each of the broad width surfaces 22a and 22b and the narrow width surfaces 22c and 22d that surround a circumference of the battery cell 11.

The upper surface 22f faces the bottom surface 22e in the height direction. In this embodiment, the battery case 22 having an approximately rectangular parallelepiped shape is formed of a bottomed case body 23 and a lid 24. The bottomed case body 23 includes the pair of the broad width surfaces 22a and 22b, the pair of narrow width surfaces 22c and 22d, and the bottom surface 22e. An upper portion of the case body 23 is opened. The lid 24 is mounted at the opening of the upper portion of the case body 23. As a sealed case, the battery case 22 is formed such that edges of the opening of the upper surface of the case body 23 at which the lid 24 is mounted is continuously welded along a peripheral portion of the lid 24. This welding is performed, for example, by laser welding.

In this embodiment, the lid 24 is provided with a positive electrode terminal 61 and a negative electrode terminal 62. The positive electrode terminal 61 includes an internal terminal strip 61a extending in the battery case 22. The internal terminal strip 61a extends along the narrow width surface 22c in the battery case 22. The negative electrode terminal 62 includes an internal terminal strip 62a extending in the battery case 22. The internal terminal strip 61a extends along the narrow width surface 22d in the battery case 22. As illustrated in FIG. 2, a safety valve 26 is provided in a central portion of the lid 24 in a length direction. A liquid injection hole 27 is provided in a position closer to the negative electrode terminal 62 in the length direction in the lid 24. After liquid is injected through the liquid injection hole 27, a cap 28 is attached to the liquid injection hole 27 and a circumference thereof is welded to seal the liquid injection hole 27.

In this embodiment, the narrow width surfaces 22c and 22d of the battery case 22 are thicker than the broad width surfaces 22a and 22b. That is, a thickness t1 of the narrow width surfaces 22c and 22d is larger than a thickness t2 of the broad width surfaces 22a and 22b. For example, the thickness t1 of the narrow width surfaces 22c and 22d may be 1.3 to 2.0 times as large as the thickness t2 of the broad width surfaces 22a and 22b.

As illustrated in FIG. 4, each of respective edge portions 22a1 and 22b1 of the broad width surfaces 22a and 22b which extend in the height direction has a thickness that gradually increases toward a corresponding one of the narrow width surfaces 22c and 22d. In other words, each of both ends of each of the broad width surfaces 22a and 22b has a thickness that gradually increases in the long-side direction. In this embodiment, outer surfaces of the broad width surfaces 22a and 22b are flat surfaces. Each of inner surfaces of the broad width surfaces 22a and 22b has a height that gradually increases toward a corresponding one of the narrow width surfaces 22c and 22d. Thus, each of the edge portions 22a1 and 22b1 of the broad width surfaces 22a and 22b which extend in the height direction has a thickness that gradually increases toward a corresponding one of the narrow width surfaces 22c and 22d. On the sides each of which connects a corresponding one of the broad width surfaces 22a and 22b and a corresponding one of the narrow width surfaces 22c and 22d to each other, the thickness of each of the edge portions 22a1 and 22b1 matches the thickness of the corresponding one of the narrow width surfaces 22c and 22b in a portion in which the corresponding one of the broad width surfaces 22a and 22b and the corresponding one of the narrow width surfaces 22c and 22d are connected to each other. In this embodiment, a thickness of a central portion of each of the broad width surfaces 22a and 22b is t2 and a confining pressure received from a battery holder 12 can be caused to act on the electrode body 21, as will be described later. The narrow width surfaces 22c and 22d have a required thickness and required rigidity. Each of the portions in which the corresponding one of the broad width surfaces 22a and 22b and the corresponding one of the narrow width surfaces 22c and 22d are connected to each other has a thickness that gradually increases and a rigidity that gradually increases accordingly.

As illustrated in FIG. 4, the electrode body 21 includes a pair of flat surfaces 21a and 21b, a first current collecting section 21c, and a second current collecting section 21d. Herein, each of the pair of the flat surfaces 21a and 21b is a surface disposed to face a corresponding one of the pair of the broad width surfaces 22a and 22b of the battery case 22. The first current collecting section 21c is a current collecting portion that extends toward the first narrow width surface 22c of the pair of narrow width surfaces 22c and 22d of the battery case 22. In the first current collecting section 21c, unformed portions 31a1 of the positive electrode sheet 31 are integrated toward a central portion in a direction in which the pair of the narrow width surfaces 22c and 22d face each other. The second current collecting section 21d extends toward the second narrow width surface 22d of the pair of narrow width surfaces 22c and 22d of the battery case 22. In the second current collecting section 21d, unformed portions 32a1 of the negative electrode sheet 32 are integrated toward a central portion in the direction in which the pair of the broad width surfaces 22a and 22b face each other to form.

Figure 5:
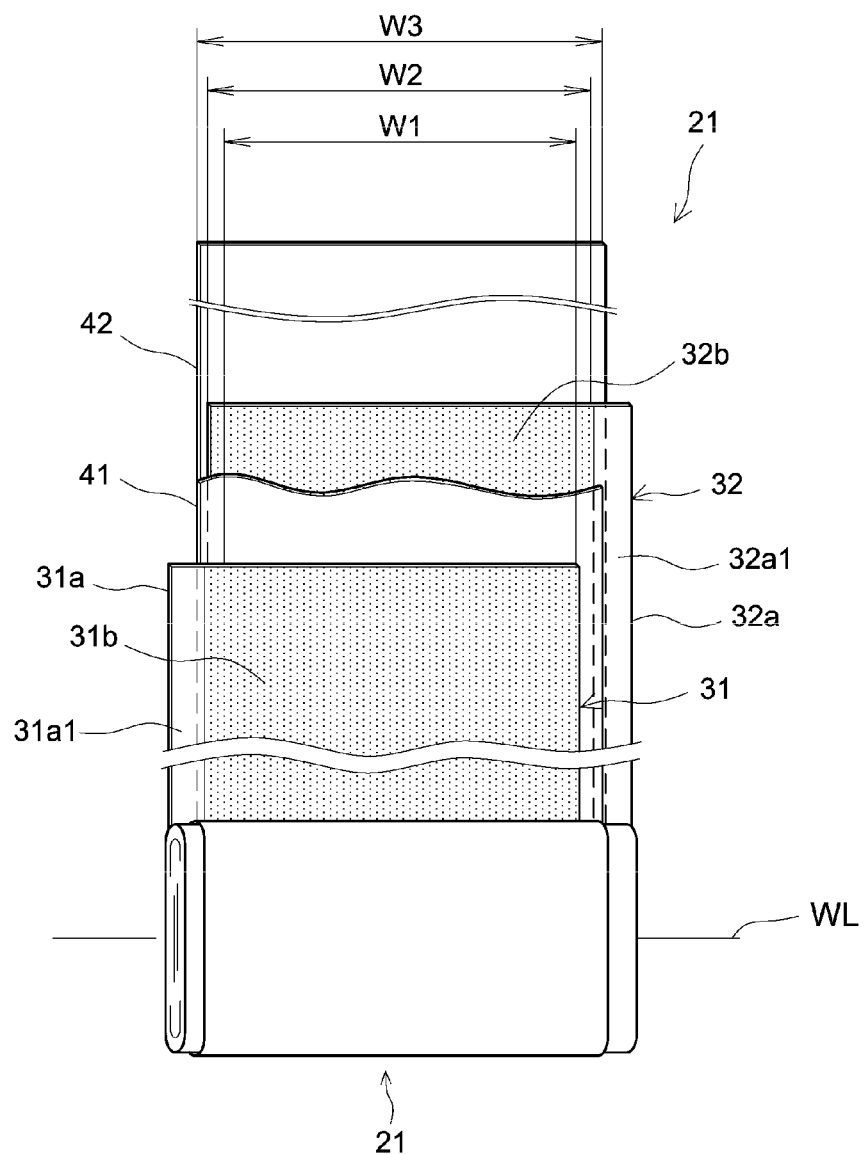
FIG. 5 is a development view of an electrode body 21 (a wound electrode body).

The electrode body 21 can be, for example, a wound electrode body. FIG. 5 is a development view of the electrode body 21 (the wound electrode body). As illustrated in FIG. 5, the electrode body 21 includes a positive electrode sheet 31, a negative electrode sheet 32, a first separator 41, and a second separator 42. Each of the positive electrode sheet 31, the negative electrode sheet 32, the first separator 41, and the second separator 42 is a belt-shaped sheet. The first separator 41 and the second separator 42 will be referred to as "separators" as appropriate in a case in which it is not particularly needed to distinguish the first separator 41 and the second separator 42 from each other.

The positive electrode sheet 31 includes a belt-shaped positive electrode current collecting foil 31a and a positive electrode active material layer 31b. A metal foil with required resistance, that is, for example, an aluminum foil, is used for the belt-shaped positive electrode current collecting foil 31a. The unformed portion 31a1 is set along one of long sides of the positive electrode current collecting foil 31a. The positive electrode active material layer 31b is formed on each of both surfaces of the positive electrode current collecting foil 31a excluding the unformed portion 31a1. The positive electrode active material layer 31b is a layer obtained by joining positive electrode active material particles by a binder and includes a gap in which an electrolyte impregnates between the positive electrode active material particles.

The positive electrode active material particles can function as a positive electrode active material of the battery cell 11. For example, in a case in which the battery cell 11 is a lithium ion secondary battery, a material, such as a lithium transition metal compound material, that emits lithium ions during charging and absorbs lithium ions during discharging can be used for the positive electrode active material particles. In general, various materials have been proposed for positive electrode active materials for lithium ion secondary batteries, and the positive electrode active material used herein is not in particular limited to the lithium transition metal compound material.

The negative electrode sheet 32 includes a belt-shaped negative electrode current collecting foil 32a and a negative electrode active material layer 32b. A metal foil with required resistance, that is, for example, a copper foil, is used for the belt-shaped negative electrode current collecting foil 32a. The unformed portion 32a1 is set along one of long sides of the negative electrode current collecting foil 32a. The negative electrode active material layer 32b is formed on each of both surfaces of the negative electrode current collecting foil 32a excluding the unformed portion 32a1.

Negative electrode active material particles can function as a negative electrode active material of the battery cell 11. For example, in a case in which the battery cell 11 is a lithium ion secondary battery, a material, such as natural graphite, that absorbs lithium ions during charging and discharges lithium ions absorbed during charging during discharging can be used for the negative electrode active material particles. In general, various materials have been proposed for negative electrode active materials for lithium ion secondary batteries, and the positive electrode active material used herein is not in particular limited to natural graphite. The negative electrode active material layer 32b is a layer obtained by joining the negative electrode active material particles by a binder and includes a gap in which an electrolyte impregnates between the negative electrode active material particles.

For the first separator 41 and the second separator 42, for example, a porous resin sheet with required heat resistance is used. The first separator 41 and the second separator 42 may have fine holes through which electrolytes can pass. Various proposals have been made for separator sheets, such as the first separator 41 and the second separator 42, and there is no particular limitation on the separator sheets. The positive electrode active material layer 31b of the positive electrode sheet 31 may be covered by the negative electrode active material layer 32b of the negative electrode sheet 32 with the first separator 41 or the second separator 42 interposed therebetween. The negative electrode active material layer 32b of the negative electrode sheet 32 may be further covered by the first separator 41 and the second separator 42.

The positive electrode sheet 31, the first separator 41, the negative electrode sheet 32, and the second separator 42 of the electrode body 21 are laminated in this order such that directions thereof are aligned to a long-side direction. Specifically, as illustrated in FIG. 5, a width W1 of the positive electrode active material layer 31b, a width W2 of the negative electrode active material layer 32b, and a width W3 of the separators satisfy a relationship expressed by W1<W2<W3. The positive electrode sheet 31, the first separator 41, the negative electrode sheet 32, and the second separator 42 are laminated in this order such that the negative electrode active material layer 32b covers the positive electrode active material layer 31b and the two separators 41 and 42 cover the negative electrode active material layer 32b. The unformed portion 31a1 (the positive electrode current collecting foil) of the positive electrode sheet 31 protrudes from the first separator 41 and the second separator 42 at one side in a direction along a winding axis WL. The unformed portion 32a1 (the negative electrode current collecting foil) of the negative electrode sheet 32 protrudes from the first separator 41 and the second separator 42 at an opposite side to the side at which the unformed portion 31a1 of the positive electrode sheet 31 protrudes in the direction along the winding axis WL.

The positive electrode sheet 31, the first separator 41, the negative electrode sheet 32, and the second separator 42 of the electrode body 21 are further wound around the winding axis WL (see FIG. 1) set in a short-side direction. As described above, the electrode body 21 is formed by winding the positive electrode sheet 31 and the negative electrode sheet 32 laminated with the long belt-shaped first separator 41 and second separator 42 interposed therebetween. The electrode body 21 is formed so as to be flat along a plane including the winding axis WL. As illustrated in FIG. 4, in the electrode body 21, the pair of the flat surfaces 21a and 21b that are parallel to the plane including the winding axis WL are formed.

The unformed portion 31a1 of the positive electrode sheet 31 protrudes from the separators 41 and 42 at one side in the direction along the winding axis WL. The unformed portion 32a1 of the negative electrode sheet 32 protrudes from the separators 41 and 42 at the opposite side to the side at which the unformed portion 31a1 of the positive electrode sheet 31 protrudes. The unformed portions 31a1 and the unformed portions 32a1 that protrude from the separator 41 and 42 are integrated in the respective sides in the direction in which the pair of flat surfaces 21a and 21b are opposed to each other.

In the electrode body 21 formed of the above described wound electrode body, the positive electrode sheet 31 and the negative electrode sheet 32 are laminated with the separators 41 and 42 interposed therebetween in the direction in which the pair of flat surfaces 21 and 21b face each other. Around the winding axis WL, the flat surfaces 21a and 21b are connected to each other via R portions 21e and 21f. The first current collecting section 21c of the electrode body 21 is provided at one side in the direction along the winding axis WL. The first current collecting section 21c of the electrode body 21 is the integrated unformed portion 31a1 of the positive electrode sheet 31. The second current collecting section 21d of the electrode body 21 is provided at the opposite side in the direction along the winding axis WL. The second current collecting section 21d of the electrode body 21 is the unformed portion 32a1 of the negative electrode sheet 32.

In FIG. 5, a wound electrode body is illustrated as an example of the electrode body 21, but the electrode body 21 is not limited to the wound electrode body. Although not illustrated, the electrode body 21 may be, for example, a laminated electrode body in which a positive electrode sheet and a negative electrode sheet are laminated with a separator interposed therebetween. In the laminated electrode body, the pair of flat surfaces 21a and 21b (see FIG. 4) are provided in a lamination direction in which the positive electrode sheet and the negative electrode sheet are laminated with the separator interposed therebetween. In this case, current collectors of the positive electrode sheet may be provided to protrude at one side of the separator, be integrated, and thus form the first current collecting section 21c of the electrode body 21. Current collectors of the negative electrode sheet may be provided to protrude at one side of the separator and be integrated and thus form the second current collecting section 21d of the electrode body 21.

Each of the first current collecting section 21c and the second current collecting section 21d of the electrode body 21 may be held in the battery case 22. In this embodiment, the first current collecting section 21c of the electrode body 21 is welded to the internal terminal strip 61a of the positive electrode terminal 61 which extends along the narrow width surface 22c in the battery case 22. The second current collecting section 21d of the electrode body 21 is welded to the internal terminal strip 62a of the negative electrode terminal 62 which extends along the narrow width surface 22d located at an opposite side. The electrode body 21 is stored in the battery case 22 so as to be enclosed by a thin insulating film (not illustrated). The electrode body 21 and the battery case 22 are electrically insulated from each other by the insulating film.

As illustrated in FIG. 1 and FIG. 2, the plurality of battery cells 11 are arranged such that the broad width surfaces 22a and 22b of the battery cases 22 face each other sequentially and the pairs of narrow width surfaces 22c and 22d and the bottom surfaces 22e are aligned. In the embodiment illustrated in FIG. 1 and FIG. 2, in adjacent ones of the battery cells 11, a direction in which the positive electrode terminal 61 and the negative electrode terminal 62 are arranged alternately differs. In adjacent ones of the battery cells 11, the broad width surfaces 22a and 22b of the battery cases 22 located at the same side face each other sequentially.

Herein, each of the broad width surfaces that face each other in the adjacent battery cases 22 may be either one of the pair of the broad width surfaces 22a and 22b of each of the battery cases 22. Each of the narrow width surfaces that face each other in the adjacent battery cases 22 may be either one of the pair of narrow width surfaces 22c and 22d of each of the battery cases 22. That is, when arranging the plurality of battery cells 11, each of the pair of the broad width surfaces 22a and 22b and the pair of narrow width surfaces 22c and 22d may be arranged in a predetermined direction. Each of the direction in which the pair of the broad width surfaces 22a and 22b are arranged and the direction in which the pair of narrow width surfaces 22c and 22d are arranged may not be set the same for all of the battery cases 22. That is, considering electrical connections between the battery cells 11, the direction in which the pair of the broad width surfaces 22a and 22b of each battery case 22 are arranged and the direction in which the pair of narrow width surfaces 22c and 22d of the battery case 22 are arranged can be determined depending on a design of a battery pack. The direction in which the battery cases 22 are arranged is not limited to that illustrated in FIG. 1 and FIG. 2, unless specifically stated otherwise.

As illustrated in FIG. 1 and FIG. 2, the intermediate holder 12a includes a planar portion 81, a protruding portion 82, and four recessed portions 83.

The planar portion 81 extends along the broad width surfaces 22a and 22a (see FIG. 2) of adjacent ones of the battery cells 11 which face each other. As illustrated in FIG. 2, the planar portion 81 is interposed between the broad width surfaces 22a and 22a of adjacent ones of the battery cells 11 which face each other. The planar portion 81 extends to reach the four side portions 22g each connecting a corresponding one of the broad width surfaces 22a and 22a (22b and 22b) of adjacent ones of the battery cells 11 and a corresponding one of the narrow width surfaces 22c and 22d of the adjacent ones of the battery cells 11. In this embodiment, the planar portion 81 of the intermediate holder 12a is configured such that a portion thereof facing an intermediate portion of a corresponding one of the broad width surfaces 22a and 22a (22b and 22b) excluding a peripheral portion thereof is raised. In this embodiment, an approximate rectangular region of each of the intermediate portions of the broad width surfaces 22a and 22a (22b and 22b) excluding the peripheral portions thereof has a flat shape and is raised.

The protruding portion 82 is provided at each of both ends of the planar portion 81 and protrudes from the broad width surfaces 22a and 22a (22b and 22b) of adjacent ones of the battery cells 11 which face each other. In other words, the intermediate holder 12a protrudes from a gap between the broad width surfaces 22a and 22a (22b and 22b) of the adjacent ones of the battery cells 11. The protruding portion 82 extends from the broad width surfaces 22a and 22a (22b and 22b) at both sides toward corresponding ones of the narrow width surfaces 22c and 22d of the adjacent ones of the battery cells 11 so as to cover the corresponding side portions 22g of the adjacent ones of the battery cells 11. That is, the protruding portion 82 extends at both sides of an edge of the planar portion 81, has a large thickness, and protrudes from the edge of the planar portion 81 to extend along the edge of the planar portion 81. The protruding portion 82 has a thickness sufficiently larger than that of the planar portion 81 and, from a view point of holding the battery cells 11, has required rigidity.

The four recessed portions 83 are provided in the protruding portions 82 of the intermediate holder 12a and are formed such that the side portions 22g at both ends of the broad width surfaces 22a and 22a (22b and 22b) of adjacent ones of the battery cells 11 which face each other are stored therein. In the intermediate holder 12a, two recessed portions 83 are provided at each side of the planar portion 81. The two recessed portions 83 provided at one side of the planar portion 81 are provided in accordance with a distance between the side portions 22g at both sides of a corresponding one of the narrow width surfaces 22c and 22d of the corresponding battery cell 11. The corresponding one of the broad width surfaces of the corresponding battery cell 11 fits to one side of the planar portion 81 of the intermediate holder 12a. Two recessed portions 83 are provided in similar positions at the other side of the planar portion 81 of the intermediate holder 12a. Therefore, the broad width surfaces of the battery cells 11 face each other such that the planar portion 81 of the intermediate holder 12a is interposed between corresponding ones of the broad width surfaces, and positions of the pair of narrow width surfaces 22c and 22d are aligned. For example, the battery cells 11 are arranged such that bottom surfaces 22e are aligned on a flat surface, and thus, the bottom surfaces 22e of the battery cells 11 forming the battery pack 10 are aligned.

In this embodiment, the planar portion 81 of the intermediate holder 12a is configured such that the portion thereof facing the intermediate portion of the corresponding one of the broad width surfaces 22a and 22a (22b and 22b) excluding the peripheral portion thereof is raised at both surfaces of the planar portion 81. Each raised portion 81a is pressed against the corresponding one of the broad width surfaces 22a and 22a (22b and 22b) of adjacent ones of the battery cells 11 which face each other.

As illustrated in FIG. 1, the end holder 12b is a battery holder configured to hold at least one of the battery cells disposed at both ends of the plurality of battery cells 11 of the battery pack 10. In FIG. 1, although not illustrated, in this embodiment, the battery pack 10 includes the end holder 12b at each of both ends of the plurality of battery cells 11.

The end holder 12b includes a planar portion 91, a protruding portion 92, and two recessed portions 93. Herein, the end holder 12b and the intermediate holder 12a function as battery holders in a similar manner. The planar portion 91, the protruding portion 92, and the recessed portions 93 of the end holder 12b have similar functions to those of the planar portion 81, the protruding portion 82, and the recessed portions 83 of the intermediate holder 12a, respectively. Therefore, for the end holder 12b, specifically, the planar portion 91, the protruding portion 92, and the recessed portions 93, refer to the description of the intermediate holder 12a, as appropriate.

The end holder 12b Includes the protruding portion 92 and the recessed portions 93 as well as a raised portion 91a at one side of the planar portion 91. The end holder 12b is also configured such that an opposite side is entirely flat along the planar portion 91. Thus, space can be saved in a direction in which the plurality of battery cells 11 are arranged. Note that, although the battery pack 10 includes the end holder 12b at each of both ends of the plurality of arranged battery cells 11, the end holder 12b may be used only at one end of the plurality of battery cells 11 and the intermediate holder 12a may be used at the other end. In the battery pack 10, the intermediate holder 12a may be used at each of the both ends of the plurality of battery cells 11. Furthermore, in a case in which the intermediate holder 12a is used at each of the both ends of the plurality of battery cells 11, a shape of a confining member that confines an outer side of each of the battery holders at both ends of the plurality of battery cells 11 may be made to coincide with a shape of the intermediate holder 12a.

In the battery pack 10, as illustrated in FIG. 1, the plurality of battery cells 11 held by the battery holders 12 are arranged such that the broad width surfaces 22a and 22b face each other sequentially and the pairs of the narrow width surfaces 22c and 22d are aligned. Although not illustrated, the planar portion 91 of the end holder 12b provided at each of both ends is pressed by the confining member, and thus, a required confining pressure is applied. The confining member is a known member, and various proposals have been made for confining members. Therefore, a required confining pressure acts on each of the broad width surfaces 22a and 22b of the battery cells 11 through the battery holder 12. Thus, a distance between the positive electrode sheet and the negative electrode sheet of the electrode body 21 is maintained small, and reduction in resistance can be achieved.

The battery pack 10 described above is mounted on a vehicle as a driving power supply for an electric motor vehicle. The vehicle is designed such that an outer side thereof is easily collapsed, as compared to a cabin space (a living space) in order to protect the cabin space when the vehicle is crashed. The battery pack 10 is stored in a position outside the cabin space, and therefore, is influenced by collapse of the vehicle when the vehicle is crashed. The narrow width surfaces 22c and 22d of the battery cells 11 are arranged close to the current collecting sections 21c and 21d of the electrode body.

The battery holder 12 disclosed herein is configured such that, in each of the intermediate holder 12a and the end holder 12b, a corresponding one of the planar portions 81 and 91 is pressed against a corresponding one of the broad width surfaces 22a and 22b of the battery holders 12. Each of the side portions 22g of the battery cells 11 fits in a corresponding one of the recessed portions 83 and 93 of the battery holders 12. Therefore, at each of the sides at which the narrow width surfaces 22c and 22d of the battery cells 11 are aligned, the battery holders 12 protrude (the portions 82 and 92), and the battery holders 12 serve as buffers.

Each of the portions 82 and 92 of the battery holders 12 includes corresponding ones of the recessed portions 83 and 92 in which the side portions 22g of the battery cells 11 fit. The side portions 22g of the battery cells 11 are curved portions each connecting corresponding ones of the broad width surfaces 22a and 22b and the narrow width surfaces 22c and 22d to each other and having relatively high rigidity among portions of the battery cases 22. Therefore, each of sides of the battery pack 10 at which the narrow width surfaces 22c and 22d of the battery cells 11 are aligned has required load resistant capacity. In this embodiment, the narrow width surfaces 22c and 22d of the battery cases 22 are thicker than the broad width surfaces 22a and 22b. Furthermore, each of edge portions of the broad width surfaces 22a and 22b which extend in the height direction has a thickness that gradually increases toward a corresponding one of the narrow width surfaces 22c and 22d. The above described configuration also contributes to increase in load resistance of each of the sides of the battery pack 10 at which the narrow width surfaces 22c and 22d of the battery cells 11 are aligned.

Furthermore, each of the battery holders 12 includes corresponding ones of the recessed portions 83 and 93 in which corresponding ones of the side portions 22g of the battery cells 11 fit in a corresponding one of the protruding portions 82 and 92 protruding from the broad width surfaces 22a and 22b. Adjacent ones of the battery holders 12 are independent from each other. When an even larger load is received at either one of the sides at which the narrow width surfaces 22c and 22d of the battery cells 11 are aligned, force tends to concentrate in the side portions 22g of the battery cells 11. As illustrated in FIG. 4, in the battery cell 11, each of the first current collecting section 21c and the second current collecting section 21d of the electrode body 21 in the battery case 22 is directed to a corresponding one of the pair of narrow width surfaces 22c and 22d of the battery case 22. Each of the first current collecting section 21c and the second current collecting section 21d is integrated in a direction toward a central portion in the direction in which the pair of the broad width surfaces 22a and 22b face each other. Therefore, there are clearances between the battery case 22 and the electrode body 21 near the side portions 22g of the battery case 22. When the battery pack 10 disclosed herein receives an even larger load, force tends to concentrate in the side portions 22g of the battery cells 11. The side portions 22g of the battery cells 11 have required rigidity, and therefore, have high load resistant capacity. Even with any one or more of the side portions 22g deformed, the battery case 22 and electrode body 21 are not likely to contact each other because there are clearances between the battery case 22 and the electrode body 21 near the side portions 22g of the battery case 22.

As described above, the battery pack 10 in which the battery cells 11 are held by the battery holders 12 (the intermediate holder 12a and the end holder 12b) have high load resistant capacity at each of the sides at which the narrow width surface 22c and 22d of the battery cells 11 are aligned in the battery pack 10. Moreover, even in a case in which a large load is received at either one of the sides at which the narrow width surface 22c and 22d of the battery cells 11 are aligned in the battery pack 10, a load tends to act on the side portions 22g of the corresponding battery case 22. Even with any one or more of the side portions 22g deformed, the battery case 22 and the electrode body 21 are not likely to interfere each other because there are clearances between the battery case 22 and the electrode body 21 near the side portions 22g of the battery case 22. Therefore, in a case in which a large load is received at either one of the sides at which the narrow width surfaces 22c and 22d of the battery cells 11 are aligned in the battery pack 10, the battery case 22 and the electrode body 21 are not likely to interfere each other. The battery holder 12 disclosed herein is configured such that the portion thereof facing the intermediate portion of the corresponding one of the broad width surfaces 22a and 22a (22b and 22b) excluding the peripheral portion thereof is raised. Each of the raised portions 81a is pressed against a corresponding one of the broad width surfaces 22a and 22b of the battery cells 11 which face each other. On the other hand, in the raised portions 81a, the thickness of the planar portion 81 is small. Therefore, in a case in which a large load is received at either one of the sides at which the narrow width surfaces 22c and 22d of the battery cells 11 are aligned in the battery pack 10, the portions of the planar portions 81 which have a small thickness are warped and the battery holders 12 can absorb deformation. Therefore, the battery holders 12 function as buffers and restrain deformation of the battery case 22.

Figure 6:
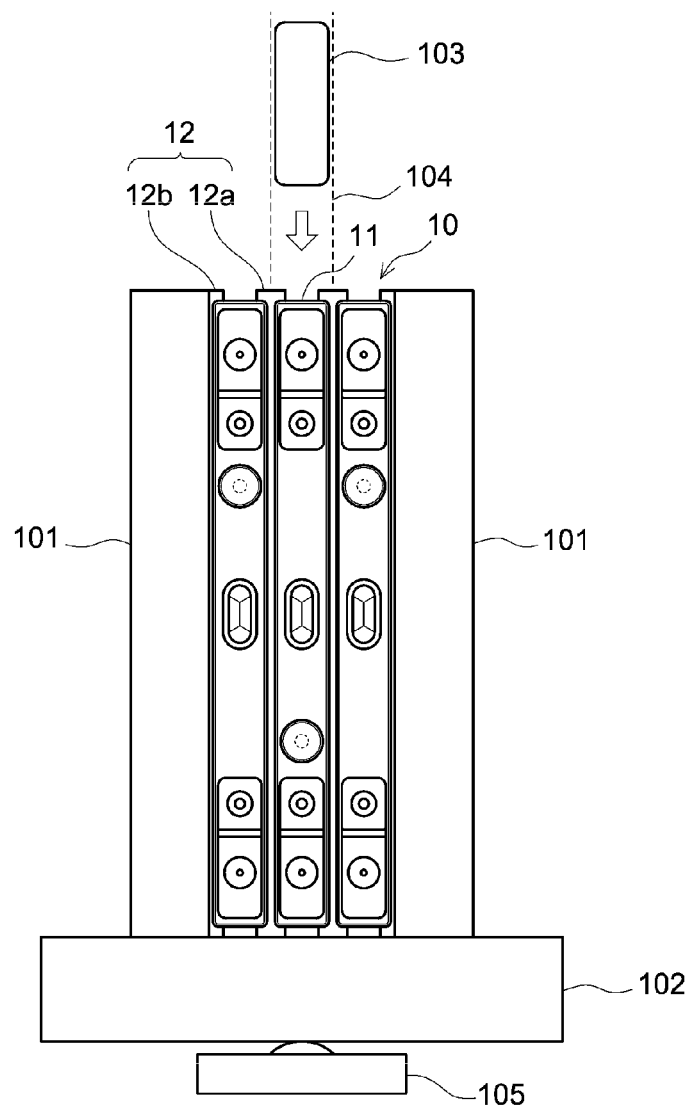
FIG. 6 is a schematic view illustrating an example of a collision test performed on a side at which narrow width surfaces 22c and 22d of the battery pack 10 are aligned.

FIG. 6 is a schematic view illustrating an example of a collision test performed on a side at which the narrow width surfaces 22c and 22d of the battery pack 10 are aligned.

In the collision test described as an example below, as illustrated in FIG. 6, the battery pack 10 in which the plurality of battery cells 11 were arranged using the battery holders 12 described above was prepared. The battery pack 10 was disposed on a test stand 102 such that one of the sides at which the narrow width surfaces 22c and 22d were aligned faced upward and the end holders 12b provided at both ends were interposed between plates 101. Then, a predetermined mass body 103 (a cubic block) was dropped on the one of the sides at which the narrow width surfaces 22c and 22d were aligned. A guide 104 used for regulating a falling direction of the mass body 103 was provided. A load cell 105 used for load measurement was disposed under the test stand 102. In this case, as the mass body 103, a mass body formed of a steel material and having a weight of 500 g was used. A load applied at the time of collision was varied by changing a height (a height from an upper surface of the battery pack 10) from which the mass body 103 was dropped. A maximum load at which plastic deformation did not occur in the battery cases 22 was measured.

In this case, the mass body in which an end portion thereof at a side which was caused to collide to the battery pack 10 had about the same width and size as those of the narrow width surface of the corresponding battery case 22 was arranged above one of the plurality of arranged battery cells 11.

In this collision test, a sample formed such that the thickness (t) of the narrow width surfaces 22c and 22d of the battery case and the thickness (t2) of the broad width surfaces 22a and 22b of the battery case were varied, a sample in which a gradually changing portion used for adjusting the thicknesses of the broad width surfaces 22a and 22b and the narrow width surfaces 22c and 22d was provided in each of the side portions 22g each connecting corresponding ones of the broad width surfaces 22a and 22b and the narrow width surfaces 22c and 22d, and a sample in which a gradually changing portion having a thickness that gradually increases toward a corresponding one of the narrow width surfaces 22c and 22d was provided in each of the edge portions 22a1 and 22b1 of the broad width surfaces 22a and 22b which extended in the height direction (see FIG. 4) were prepared. Test results were evaluated as indicted in Table 1.

TABLE 1

|  | Thickness of narrow width surface (t1) (mm) | Thickness of broad width surface (t2) (mm) | Gradually changing portion | Maximum load F (N) at which plastic deformation does not occur |
| --- | --- | --- | --- | --- |
| Sample 1 | 0.65 | 0.4 | Side portion | 750 |
| Sample 2 | 0.65 | 0.4 | Edge portion of broad width surface | 1200 |
| Sample 3 | 0.8 | 0.4 | Edge portion of broad width surface | 1400 |

For Sample 1, the thickness (t) of the narrow width surfaces 22c and 22d was 0.65 mm, the thickness (t2) of the broad width surfaces 22a and 22b was 0.40 mm, and the gradually changing portions were provided in the side portions 22g. In this case, a maximum load F with which plastic deformation did not occur in the battery case 22 was approximately 750 N.

For Sample 2, the thickness (t) of the narrow width surfaces 22c and 22d was 0.65 mm, the thickness (t2) of the broad width surfaces 22a and 22b was 0.40 mm, and the gradually changing portions were provided in the edge portions 22a1 and 22b1 of the broad width surfaces 22a and 22b which extended in the height direction. In this case, the maximum load F with which plastic deformation did not occur in the battery case 22 was approximately 1200 N.

For Sample 3, the thickness (t1) of the narrow width surfaces 22c and 22d was 0.80 mm, the thickness (t2) of the broad width surfaces 22a and 22b was 0.40 mm, and the gradually changing portions were provided in the edge portions 22a1 and 22b1 of the broad width surfaces 22a and 22b which extended in the height direction. In this case, the maximum load F with which plastic deformation did not occur in the battery case 22 was approximately 1400 N.

As described above, according to the test conducted by the present inventor, as compared to a case (Sample 1) in which the gradually changing portions are provided in the side portions 22g (the R portions each connecting corresponding ones of the broad width surfaces 22a and 22b and the narrow width surfaces 22c and 22d), in a case (Sample 2) in which the gradually changing portions are provided in the edge portions 22a1 and 22b1 of the broad width surfaces 22a and 22b which extend in the height direction, deformation accompanied with plastic deformation in the battery case 22 is less likely to occur. Furthermore, as indicated by a test result for Sample 3, the larger the thickness (t1) of the narrow width surfaces 22c and 22d is, the less deformation accompanied with plastic deformation in the battery case 22 is likely to occur.

As illustrated in FIG. 2, an embodiment of the battery holder 12 disclosed herein includes a corresponding one of the planar portions 81 and 91 provided so as to coincide with a corresponding one of the broad width surfaces 22a and 22b of the corresponding rectangular battery cell 11 which have been determined in advance and a corresponding one of the protruding portions 82 and 92 provided in each of both ends of the corresponding one of the planar portions 81 and 91 and protruding from the corresponding one of the broad width surfaces 22a and 22b. Each of the protruding portions 82 and 92 includes corresponding ones of the recessed portions 83 and 93 in which the side portions 22g provided at both ends of the corresponding one of the broad width surfaces 22a and 22b fit when the corresponding one of the broad width surfaces 22a and 22b of the battery cell 11 is formed to coincide with each of the planar portions 81 and 91.

Another embodiment of the battery holder 12 disclosed herein includes the planar portion 81 provided so as to coincide with a corresponding one of the broad width surfaces 22a and 22b of the corresponding rectangular battery cell 11 which have been determined in advance and the protruding portions 82 provided in each of both ends of the planar portion 81 and protruding from the corresponding one of the broad width surfaces 22a and 22b. The protruding portion 82 includes the recessed portions 83 in which the side portions 22g provided at both ends of the corresponding one of the broad width surfaces 22a and 22b fit when the corresponding one of the broad width surfaces 22a and 22b of the battery cell 11 is formed to coincide with each of the both sides of the protruding portion 82.

As described above, according to the battery pack and the battery holder disclosed herein, in a case in which the battery pack is mounted on a vehicle, deformation accompanied with plastic deformation is less likely to occur in the battery case 22 when the battery pack receives an impact at the time of collision. In the battery case 22, deformation can be easily caused to occur in the side portions 22g. As described above, a position in which deformation tends to occur can be set. Therefore, for example, the battery pack and the battery holder disclosed herein are preferable particularly for a battery pack used as a driving power supply mounted on electric motor vehicle, such as a plug-in hybrid vehicle (PHV), a hybrid vehicle (HV), and an electric vehicle (EV).

The battery pack and the battery holder disclosed herein have been variously described above. The embodiments or the like of the battery pack and the battery holder described herein do not limit the present disclosure, unless specifically stated otherwise. Moreover, various changes may be made to the battery pack and the battery holder disclosed herein, and each of components and processes described herein can be omitted as appropriately or can be combined with another one or other ones of the components and the processes, unless a particular problem occurs.

What is claimed is:

1. A battery pack comprising:
a plurality of arranged battery cells; and
a battery holder configured to hold the battery cells, wherein
each of the battery cells includes an electrode body and a battery case that stores each electrode body,
each battery case includes:
a pair of broad width surfaces facing each other;
a pair of narrow width surfaces facing each other; and
four side portions, each side portion connecting corresponding ones of the broad width surfaces and the narrow width surfaces,
the plurality of battery cells are arranged such that the broad width surfaces sequentially face each other and the pair of narrow width surfaces are aligned,
the battery holder includes:
a pair of end holders, each end holder being configured to hold a battery cell of the plurality of battery cells and being disposed at a respective end of the plurality of battery cells; and
a plurality of intermediate holders, each intermediate holder being disposed between adjacent battery cells of the plurality of battery cells,
each of the end holders includes:
a first planar portion extending along a corresponding one of the broad width surfaces of the battery cells; and
a first protruding portion provided at each of both ends of the first planar portion and protruding from the corresponding broad width surface, and the first protruding portion including a first recessed portion in which a corresponding one of the side portions provided at both sides of the corresponding broad width surface fits,
each of the intermediate holders includes:
a second planar portion extending along corresponding broad width surfaces of corresponding adjacent battery cells; and
a second protruding portion provided at each of both ends of the second planar portion and protruding from a gap between the corresponding broad width surfaces of the corresponding adjacent battery cells, and
each intermediate holder is arranged independently of each of the other intermediate holders, without contacting each other, and without contacting narrow width surfaces of the corresponding adjacent battery cells.

2. The battery pack according to claim 1,
wherein for each of the end holders:
the first planar portion is configured such that a portion thereof facing an intermediate portion of the corresponding one of the broad width surfaces excluding a peripheral portion of the corresponding one of the broad width surfaces is raised.

3. The battery pack according to claim 1,
wherein for each of the intermediate holders:
the second protruding portion includes a second recessed portion in which the corresponding one of the side portions provided at both sides of each of the corresponding broad width surfaces of the corresponding adjacent battery cells, fits.

4. The battery pack according to claim 3,
wherein for each of the intermediate holders:
the second planar portion is configured such that a portion thereof facing an intermediate portion of the corresponding one of the broad width surfaces, excluding a peripheral portion of the corresponding one of the broad width surfaces, is raised toward each of both sides.

5. The battery pack according to claim 1,
wherein for each of the end holders:
the first planar portion is configured such that a portion thereof facing an intermediate portion of the corresponding one of the broad width surfaces, excluding a peripheral portion of the corresponding one of broad width surfaces, is raised.

6. The battery pack according to claim 1,
wherein for each of the end holders:
an opposite side to a side facing the battery cell is a flat surface.

7. The battery pack according to claim 1,
wherein each electrode body includes:
a pair of flat surfaces each facing a corresponding one of the pair of broad width surfaces of each battery case;
a first current collecting section extending toward a first narrow width surface of the pair of narrow width surfaces of each battery case and integrated toward a central portion in a direction in which the pair of the broad width surfaces face each other; and a second current collecting section extending toward a second narrow width surface of the pair of narrow width surfaces of each battery case and integrated toward the central portion in the direction in which the pair of the broad width surfaces face each other.

8. The battery pack according to claim 1,
wherein a thickness of the narrow width surfaces of each battery case is larger than that of the broad width surfaces.

9. The battery pack according to claim 1,
wherein an edge portion of each of the broad width surfaces which extends in a height direction has a thickness that gradually increases toward a corresponding one of the narrow width surfaces.

10. A battery holder comprising:
a pair of end holders, each end holder being configured to hold a battery cell of a plurality of battery cells and being disposed at a respective end of the plurality of battery cells;
a plurality of intermediate holders, each intermediate holder being disposed between adjacent battery cells of the plurality of battery cells, wherein
each end holder includes:
a first planar portion provided so as to coincide with a broad width surface of a rectangular battery cell which has been determined in advance; and
a first protruding portion provided at an edge of each of ends of the first planar portion and protruding from the broad width surface, the first protruding portion including a first recessed portion in which a corresponding one of side portions provided at both sides of the broad width surface fits when the broad width surface of the battery cell is formed to coincide with the first planar portion,
each intermediate holder includes:
a second planar portion extending along corresponding broad width surfaces of corresponding adjacent battery cells; and
a second protruding portion provided at each of both ends of the second planar portion and protruding from a gap between corresponding broad width surfaces of the adjacent battery cells, the broad width surfaces facing each other and being orthogonal to a pair of narrow width surfaces that face each other, and
each intermediate holder is arranged independently of each of the other intermediate holders, without contacting each other, and without contacting narrow width surfaces of the corresponding adjacent battery cells.

11. The battery holder according to claim 10,
wherein for each of the end holders:
the first planar portion is configured such that a portion thereof facing an intermediate portion of a corresponding broad width surface excluding a peripheral portion of the corresponding broad width surface is raised.

12. A battery holder comprising:
a pair of end holders, each end holder being configured to hold a battery cell of a plurality of battery cells and being disposed at a respective end of the plurality of battery cells; and
a plurality of intermediate holders, each intermediate holder being disposed between adjacent battery cells of the plurality of battery cells, wherein
each end holder includes:
a first planar portion provided so as to coincide with a broad width surface of a rectangular battery cell which has been determined in advance; and
a first protruding portion provided at an edge of each of ends of the first planar portion and protruding from the broad width surface, the first protruding portion including a first recessed portion in which a corresponding one of side portions provided at both sides of the broad width surface fits when the broad width surface of the battery cell is aligned with each of both sides of the first planar portion,
each intermediate holder includes:
a second planar portion extending along corresponding broad width surfaces of corresponding adjacent battery cells; and
a second protruding portion provided at each of both ends of the second planar portion and protruding from a gap between corresponding broad width surfaces of the adjacent battery cells, the broad width surfaces facing each other and being orthogonal to a pair of narrow width surfaces that face each other, and
each intermediate holder is arranged independently of each of the other intermediate holders, without contacting each other, and without contacting narrow width surfaces of the corresponding adjacent battery cells.

13. The battery holder according to claim 12,
wherein for each of the intermediate holders:
the first planar portion is configured such that a portion thereof facing an intermediate portion of a corresponding broad width surface excluding a peripheral portion of the corresponding broad width surface is raised.

* * * * *